United States Patent [19]

Nakayama et al.

[11] Patent Number: 4,658,643

[45] Date of Patent: Apr. 21, 1987

[54] APPARATUS FOR DETECTING ABNORMALITY AND LIMIT OF USE OF PLAIN BEARINGS

[75] Inventors: Yoshihiko Nakayama; Teruyoshi Miyatake, both of Ibaraki, Japan

[73] Assignee: Hitachi, Ltd., Tokyo, Japan

[21] Appl. No.: 831,298

[22] Filed: Feb. 20, 1986

[30] Foreign Application Priority Data

Feb. 20, 1985 [JP]  Japan ................................. 60-30320

[51] Int. Cl.[4] ........................................... G01M 15/00
[52] U.S. Cl. ................... 73/119 R; 116/208; 340/682
[58] Field of Search .................... 73/118.1, 119 R; 116/266, 268, DIG. 7, 208; 340/59, 60, 682; 123/196 S

[56] References Cited

U.S. PATENT DOCUMENTS 4,406,169  9/1983  Ikeuchi et al. ................. 340/682 X Primary Examiner—Jerry W. Myracle
Attorney, Agent, or Firm—Antonelli, Terry & Wands

[57] ABSTRACT

This invention is related to an apparatus for detecting an abnormal condition and limit of use of a forced lubricating plain bearing which supports a rotary shaft. An oiling pressure bore is formed in the plain bearing, and a pressure detector is connected to this oiling pressure bore. The oiling pressure bore is communicated with a lubricating oil feed bore via a throttle element. A closed portion of the oiling pressure bore is melted and broken by the heat generated when seizure occurs on the plain bearing, to cause a decrease in the oil pressure. This decrease in the oil pressure is detected to ascertain that the plain bearing is in an abnormal condition or reaches a limit of use.

13 Claims, 2 Drawing Figures

APPARATUS FOR DETECTING ABNORMALITY AND LIMIT OF USE OF PLAIN BEARINGS

BACKGROUND OF THE INVENTION

This invention relates to an apparatus for detecting the abnormality and limit of use of a plain bearing which supports a rotary shaft.

The method disclosed in U.S. Pat. No. 4460893 is known as one of the methods of detecting the abnormality of bearings. This U.S. Patent shows the detecting by a thermocouple of a temperature rise occurring when an abnormal metallic contact takes place between a rotary shaft and a bearing.

However, in this method, a complicated control circuit is required to detect an abnormal condition of a bearing. Moreover, when a bearing wears so greatly that the abrasion loss of the bearing has exceeded a limit level, detecting this abnormality is impossible.

SUMMARY OF THE INVENTION

An object of the present invention is to provide an apparatus for detecting the abnormality and limit of use of plain bearings, which is capable of detecting the abnormal condition of a plain bearing and the limit of use thereof.

Another object of the present invention is to provide an apparatus for detecting the abnormality and limit of use of plain bearings, having a simple construction and capable of detecting the abnormal condition of a plain bearing and the limit of use thereof.

Still another object of the present invention is to provide an apparatus capable of reliably detecting the abnormal condition of a plain bearing and the limit of use thereof.

A further object of the present invention is to provide an apparatus for detecting the abnormal condition and limit of use of plain bearings, which is capable of preventing the damage to a plain bearing from causing a rotary body, which includes a rotary shaft supported on the plain bearing, to be damaged.

To achieve these objects, the present invention provides an apparatus for detecting the abnormality and limit of use of plain bearings, which includes a bearing having a bearing base metal, a metal member attached to the inner surface of the bearing base metal, an oiling bore formed so as to extend through the bearing base metal and metal member, and an oiling pressure bore formed so as to extend through the bearing base metal and be positioned at its bottom in the metal member; and an oil pressure detector communicated with the oiling pressure bore, this oiling pressure bore being communicated with the oiling bore or an oil suppling source via a throttle means, such as an orifice and a throttle valve.

DESCRIPTION OF THE PREFERRED EMBODIMENTS

Figure 1:
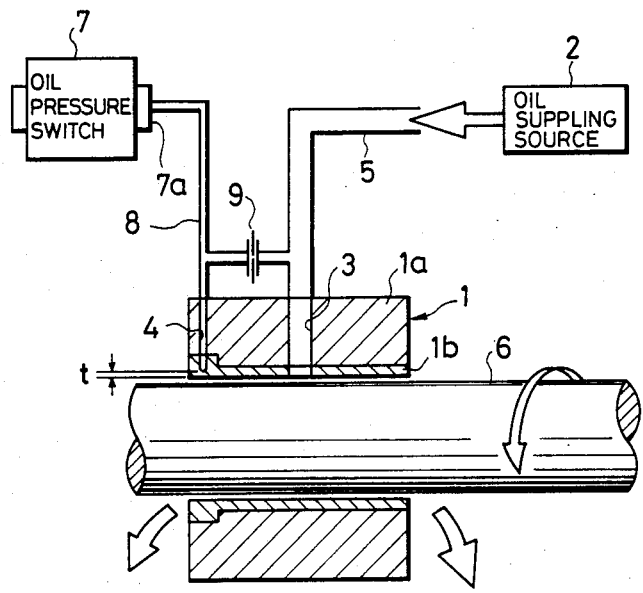
FIG. 1 is a system diagram of a first embodiment of the present invention.

FIG. 1 shows a first embodiment of the present invention. Reference numeral 1a denotes a bearing base metal fixed to a casing (not shown), and 1b a babbit metal attached to the inner circumferential surface of the bearing base metal 1a, these constituting a plain bearing 1. Reference numeral 3 denotes an oiling bore extending through the babbit metal 1b and bearing base metal 1a, and 4 an oiling pressure bore provided in an end portion of the bearing base metal 1 and closed with the babbit metal 1b. Reference numeral 2 denotes an oil supply source, and a high-pressure lubricating oil sent from this oil supply source 2 flows through the oiling bore 3, which is communicated with an oiling pipe 5, to be injected into a clearance between a rotary shaft 6 in a rotary body and the babbit metal 1b. The oil pressure bore 4 is connected to a high pressure portion 7a of a pressure detector, such as an oil pressure switch 7 via a switch-connected pipe 8. This switch-connected pipe 8 is joined to the oiling pipe 5 via an orifice 9. When the plain bearing 1 is in a normal condition, the oil pressure in the switch-connected pipe 8 is equal to the oiling pressure.

This embodiment has the above-described construction. Accordingly, when the babbit metal 1b starts being burnt from a certain cause, the oiling pressure bore 4 becomes ready to be broken because of frictional heat and wear of the babbit metal 1b caused by said burning. And then the oiling pressure bore 4 is broken easily since it receives an oil pressure from one side thereof. The supplying of oil is restricted by the orifice 9. Therefore, even when the oiling pressure bore 4 is broken to cause a small amount of oil to flow out, the pressure in the switch-connected pipe 8 decreases immediately, so that the oil pressure switch 7 is operated to enable a stop signal to be sent to an operation controller in the machine. Owing to this construction, when an abnormal phenomenon occurs on the plain bearing 1, it can be detected early and reliably, and this abnormal condition of the bearing can be prevented from causing the rotary body to be damaged. Namely, this embodiment can confine the damage to the babbit metal 1b alone.

Even if an abnormal phenomenon does not occur on the bearing 1, the inner circumferential surface of the babbit metal 1b wears gradually while the bearing 1 is used for a long period of time, and the distance t between the inner circumferential surface of the babbit metal 1b and the bottom surface of the oiling pressure bore 4 decreases. If this distance t has exceeded a lower limit level, the babbit metal 1b becomes unbearable to the oiling pressure to be broken. What is to subsequently occur in this apparatus is identical with the corresponding portion of the operation of the same apparatus when an abnormal phenomenon occurs in the bearing 1. Therefore, a description of this part of the operation will be omitted.

Figure 2:
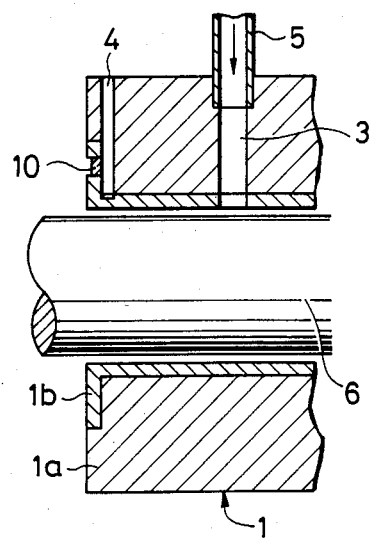
FIG. 2 is a sectional view of a principal portion of a second embodiment of the present invention.

FIG. 2 shows a second embodiment of the present invention. In this embodiment, a side bore communicated with the oiling pressure bore 4 is formed in a side place of a babbit metal 1b, a plug 10 is inserted in this side bore. The material constituting this plug 10 shall be a substance which is melted at around 100° C., for example, a Rose's metal (alloy of Bi, Pb, Sn or Cd) or solder.

Since the material of which the plug 10 is formed is a material the melting point of which is lower than of the babbit metal 1b, the plug 10 is melted in an initial stage of seizure of the babbit metal 1b to operate an oil pressure switch 7. Accordingly, an abnormal condition of the bearing can be detected early. The remaining portions of this embodiment are identical with the corresponding portions of the embodiment of FIG. 1, and, therefore, the illustration and description thereof will be omitted.

What is claimed is:

1. An apparatus for detecting the abnormality and limit of use of plain bearings, comprising a plain bearing which has a bearing base metal, and a metal member attached to the inner surface of said bearing base metal and supporting a rotary shaft; an oiling passage means formed through said plain bearing base metal and said metal member and adapted to be used for supplying a lubricating oil to a clearance between said metal member and said rotary shaft; an oil suppling source means connected to said oiling passage means; an oiling pressure bore means formed through said plain bearing base metal and a part of said metal member and closed at its one end with said metal member; a pressure detecting means connected to said oiling pressure bore means; a pipe means for communicating either one of said oiling passage means and said oil suppling source means with said oiling pressure bore means; and a throttle means provided at an intermediate portion of said pipe means.

2. An apparatus for detecting the abnormality and limit of use of plain bearings according to claim 1, wherein said throttle means consists of an orifice.

3. An apparatus for detecting the abnormality and limit of use of plain bearings according to claim 1, wherein said metal member consists of a babbit metal.

4. An apparatus for detecting the abnormality and limit of use of plain bearings according to claim 1, wherein said pressure detecting means is adapted to generate a signal, which indicates that said plain bearing is in an abnormal condition or reaches a limit of use, when a pressure lower than a set level is detected.

5. An apparatus for detecting the abnormality and limit of use of plain bearings, comprising a plain bearing which has a bearing base metal, and a metal member attached to the inner surface of said bearing base metal and supporting a rotary shaft; an oiling passage means formed through said plain bearing base metal and said metal member and adapted to be used for supplying a lubricating oil to a clearance between said metal member and said rotary shaft; an oil suppling source means having an oil feed pipe communicated with said oiling passage means, and an oil suppling source connected to said oil feed pipe; an oiling pressure bore means formed through said plain bearing base metal and a part of said metal member so that the bottom of said bore means is positioned in said metal member; a pressure detecting means connected to an open end of said oiling pressure bore means; a pipe means for communicating either one of said oiling passage means and said oil suppling source means with said oiling pressure bore means; and a throttle means provided at an intermediate portion of said pipe means.

6. An apparatus for detecting the abnormality and limit of use of plain bearings according to claim 5, wherein said throttle means consists of an orifice.

7. An apparatus for detecting the abnormality and limit of use of plain bearings according to claim 5, wherein said metal member consists of a babbit metal.

8. An apparatus for detecting the abnormality and limit of use of plain bearings according to claim 5, wherein said pressure detecting means is adapted to generate a signal, which indicates that said plain bearing is in an abnormal condition or reaches a limit of use, when a pressure lower than a set level is detected.

9. An apparatus for detecting the abnormality and limit of use of plain bearings according to claim 5, wherein a side bore communicated with said oiling pressure bore means is formed, a plug being inserted in said side bore, which plug consists of a material of a melting point lower than that of said metal member.

10. An apparatus for detecting the abnormality and limit of use of plain bearings, comprising a plain bearing which has a bearing base metal, and a babbit metal attached to the inner surface of said bearing base metal and supporting a rotary shaft; an oiling passage beans formed through said plain bearing base metal and said babbit metal and adapted to be used for supplying a lubricating oil to a clearance between said babbit metal and said rotary shaft; an oil suppling source means having an oil feed pipe communicated with said oiling passage means, and an oil suppling source connected to said oil feed pipe; an oiling pressure bore means formed through said plain bearing base metal and a part of said babbit metal so that the bottom of said bore means is positioned in said babbit metal; a pressure detecting switch connected to an open end of said oiling pressure bore; a pipe means for communicating said oiling passage means and said oiling pressure bore means with each other; and a throttle means provided at an intermediate portion of said pipe means.

11. An apparatus for detecting the abnormality and limit of use of plain bearings according to claim 10, wherein said throttle means consists of an orifice.

12. An apparatus for detecting the abnormality and limit of use of plain bearings according to claim 10, wherein said pressure detecting means is adapted to generate a signal, which indicates that said plain bearing is in an abnormal condition or reaches a limit of use, when a pressure lower than a set level is detected.

13. An apparatus for detecting the abnormality and limit of use of plain bearings according to claim 10, wherein a side bore communicated with said oiling pressure bore means is formed, a plug being inserted in said side bore, which plug consists of a material of a melting point lower than that of said metal member.

* * * * *